March 13, 1973   C. L. KEGLER   3,720,302
CONVEYOR SYSTEM FOR TRAYS
Filed Sept. 4, 1970   3 Sheets-Sheet 1
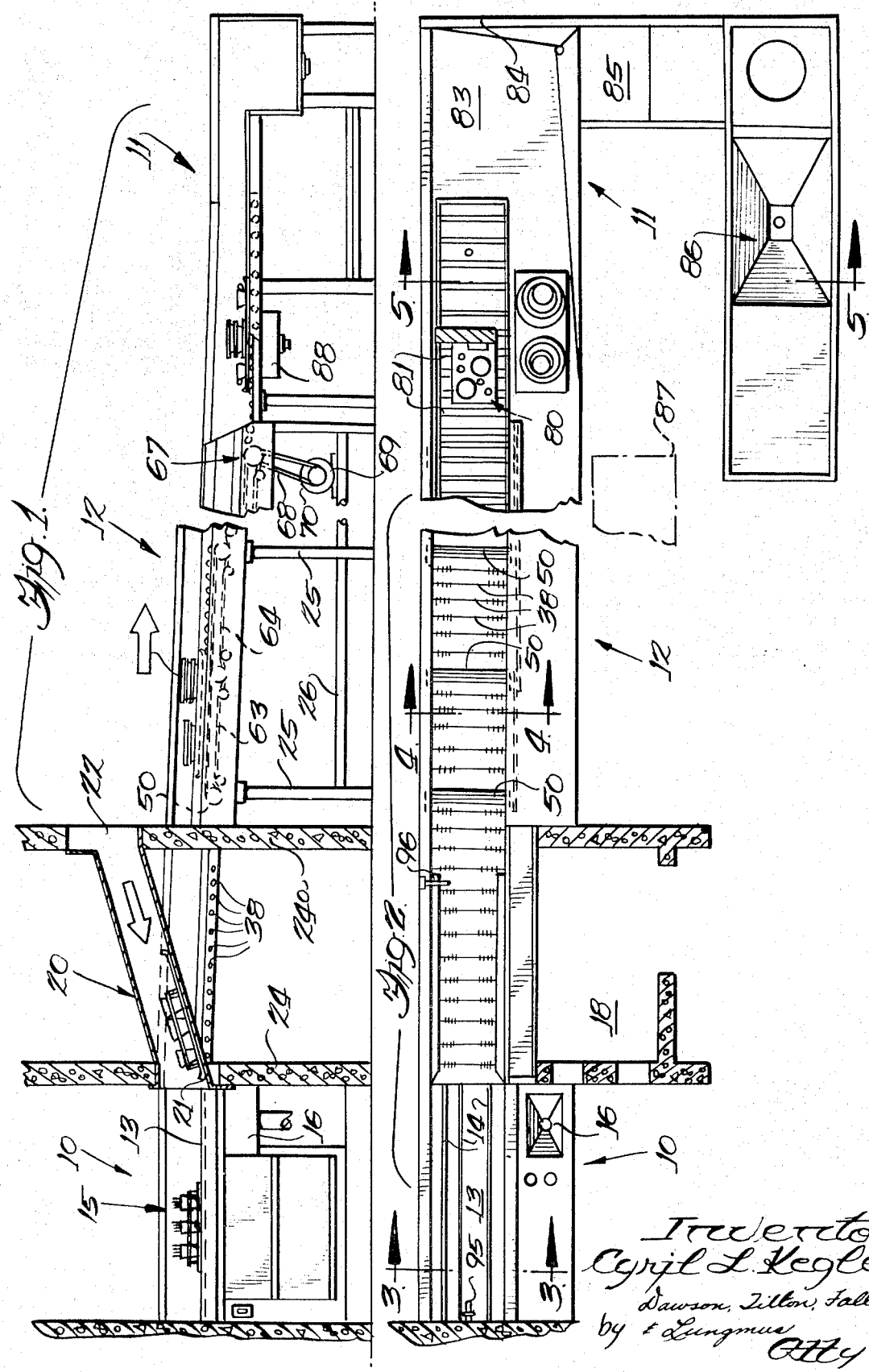
Inventor
Cyril L. Kegler
Dawson, Tilton, Fallon
by & Lungmus
Atty's

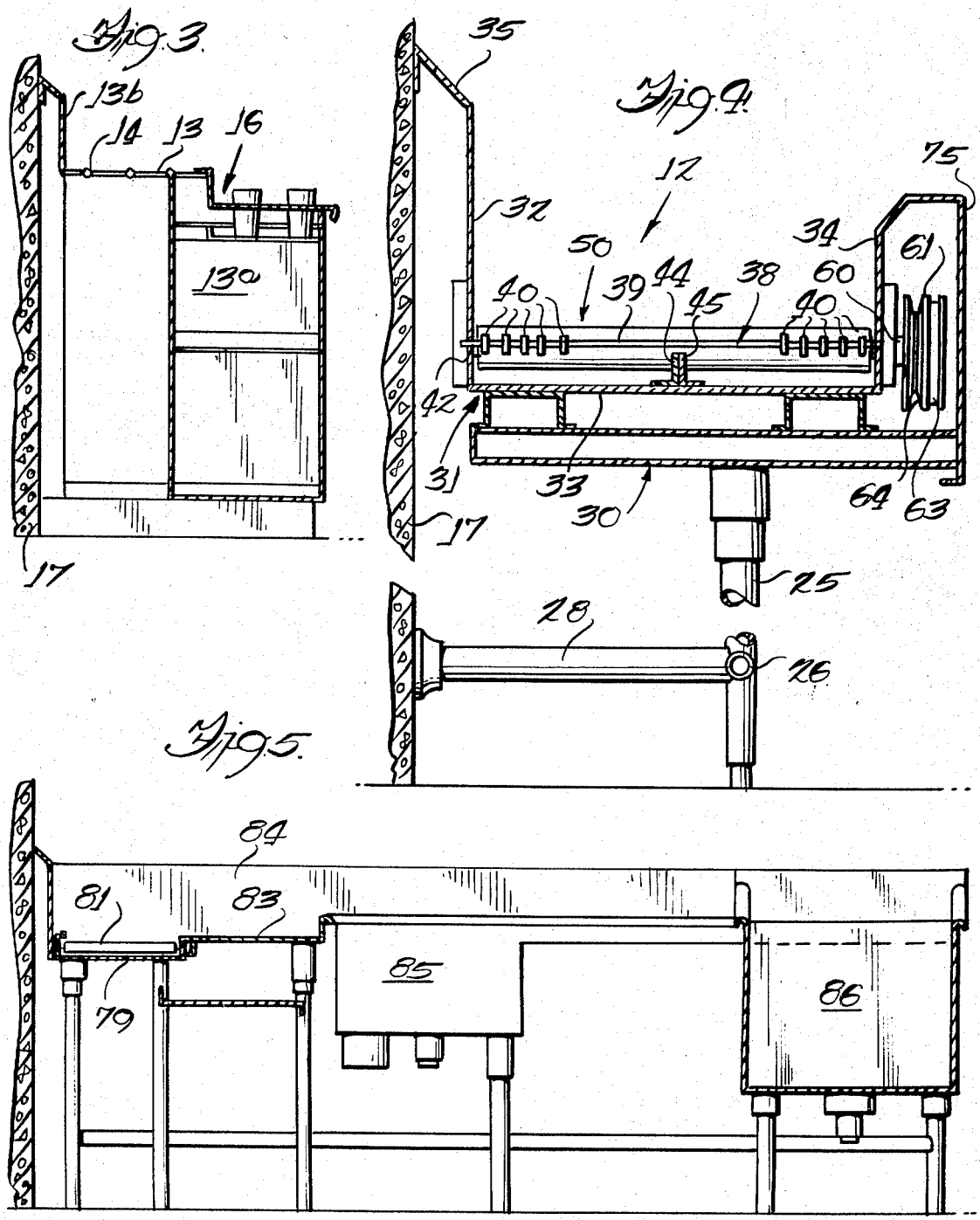

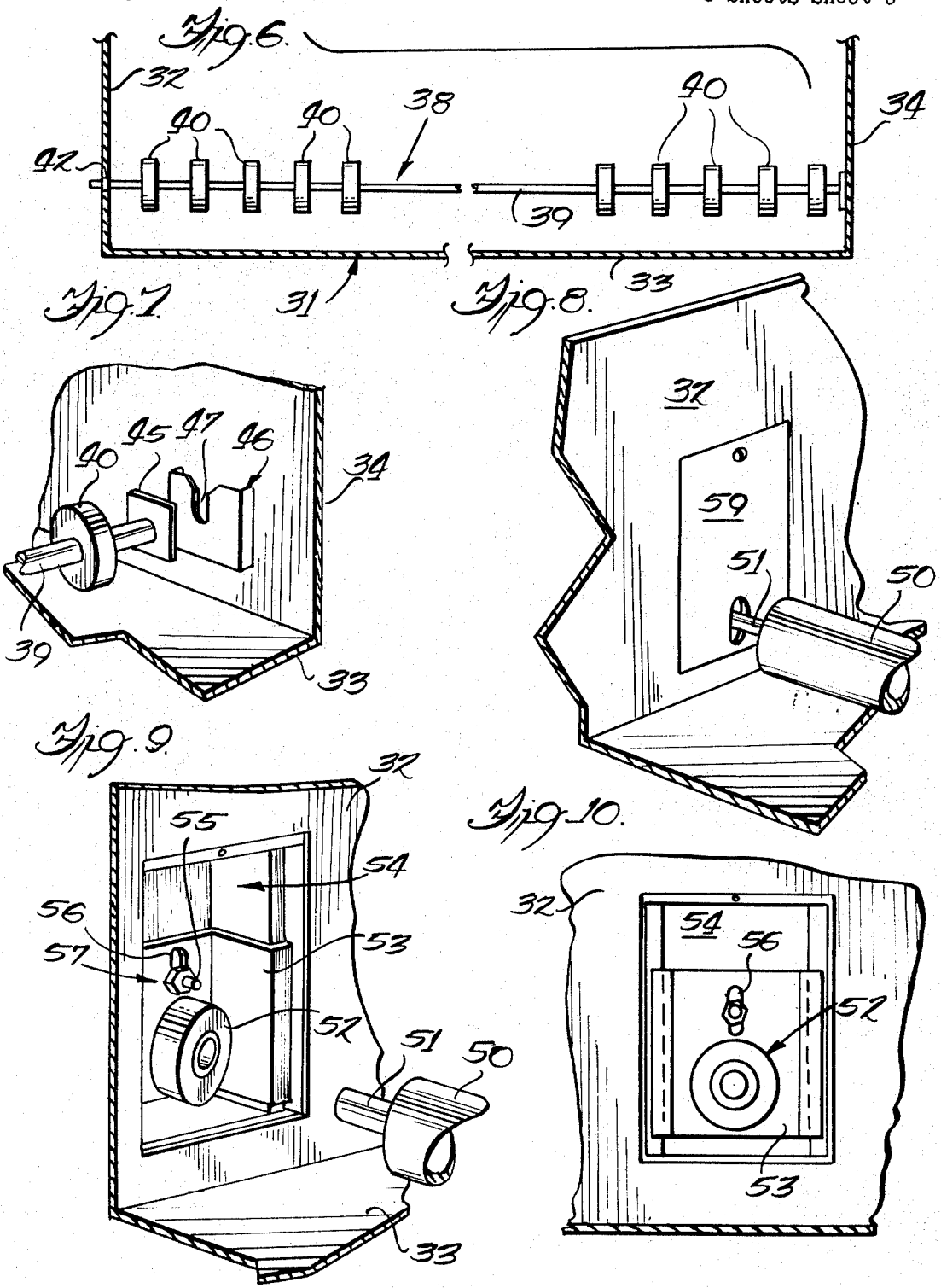

United States Patent Office 3,720,302
Patented Mar. 13, 1973

3,720,302
CONVEYOR SYSTEM FOR TRAYS
Cyril L. Kegler, Cedar Rapids, Iowa, assignor to Bishop Buffets, Inc., Cedar Rapids, Iowa
Filed Sept. 4, 1970, Ser. No. 69,819
Int. Cl. B65g 13/02
U.S. Cl. 198—127
7 Claims

ABSTRACT OF THE DISCLOSURE

A conveyor system for use, for example, in transporting trays containing variable loads of dishware, silverware, glasses, etc., in a food service establishment, includes a plurality of freely rotatable support rollers spaced along the conveyor track at a predetermined pitch for supporting the trays as they move under force of gravity. A series of powered rollers rotating at constant speed and provided with a surface of low friction material are also spaced along the conveyor track at the same pitch as the support rollers but at a greater interval. Adjacent ones of the powered rollers are preferably spaced at a little less than about twice the length of a tray. With this arrangement, loaded trays may accumulate along the conveyor track with the powered rollers slipping against the bottom surfaces of the trays when blocked by the accumulating trays ahead. Yet when trays are removed from the discharge end, the remaining trays are urged forward by the powered rollers. The powered rollers also regulate the speed of the traveling trays, for example, in arresting the speed of a heavily loaded tray and increasing the speed of a lightly loaded tray. A water-tight pan forms a trough beneath the track, and the support rollers are easily removed for cleaning and sanitizing the conveyor pan.

BACKGROUND OF THE INVENTION (A) Field of the invention

The present invention relates to conveyor systems; and more particularly, it relates to a system for conveying trays bearing variable amounts of tableware such as dishes, silverware and glassware. Typically, such conveyor systems are used to transport trays of tableware from a location in the dining area to a remote location in the kitchen where the dishes are scraped and placed into a dishwashing machine. Persons skilled in the art will appreciate, however, that the present invention has broader application than moving trays only. The term "trays" then is intended to include boxes, racks, etc. whether empty or loaded.

(B) Prior systems

There are presently two principal types of conveyor systems used to convey dishes in eating establishments: the powered belt and the gravity system. In the powered belt (or continuous track) system trays are moved by a powered continuous belt, series of moving pads, or track facility, starting from a point of dining room tableware accumulation to a remote dishwashing department. To avoid piling up an excessive dish breakage at the end of the powered system, two limit switches are normally employed, located at the end of the belt to stop the conveyor when a second tray reaches the end of the conveyor. The second tray triggers the second switch, the first (end) switch having been triggered (off) by the first tray to reach the end. This type of system has disadvantages in that it provides no storage or accumulation of trays of tableware during the preduty period of the dishwashing personnel; and that but two trays at the conveyor end immobilize the conveyor for additional loading use until one of the two trays at the limit switches has been removed. Operators are thus required to keep the conveyor in operation continuously. Further, a large efficient dishwashing machine is built to accommodate a large capacity of items and, of course, that efficiency is lost to great inefficiency when low volumes of dishes "dribble" through the hands of personnel and the machine. Other operators are required to load and unload the machine to cope with the high capacity efficient production of this machine. If the belt type of conveyor is to be left on continuously, the trays of dishware will obviously be transported from the dining area. However, continuous operation of the belt requires the continuous employment of personnel for tray removal at the end of the belt, and incurring an added operating cost.

In the gravity system, a continuous bed of free running rollers is pitched from an input and to a discharge end, and the trays are moved under force of gravity. One of the principal disadvantages of this type of system as a conveyor in the food service industry is that it is virtually impossible to control the speed of the decending trays. As the length of the conveyor increases, so does the speed of the trays. Further, the speed of the trays varies with the weight of the load on each tray. Thus, an overload tray, traveling at a higher speed, may crash into a lighter forward tray and jam the conveyor bed or, more importantly, often crashing into accumulated trays at or near the end, when then traveling at its greatest speed, causing a piling up of trays, a scattering of dishes and serious breakage—as well as an interruption in working procedures while the pileup is removed. Further, currently available systems employing the gravity feed principle are difficult to clean and sanitize.

It will be appreciated that the weight of loads on trays varies significantly, for example, one tray might be loaded with dishes of six guests in which case the tray would be fairly heavily loaded. On the other hand, a subsequent tray might be loaded with only a single guest's dishes, and its total weight would be substantially less than that of the preceding tray. Various other loadings between these two extremes can readily be appreciated. In the free-running type of gravity conveyor, the speed of the trays is dependent upon the load in the trays, and this is undesirable in that heavier loaded faster trays create hazard whereas lighter loaded trays will not travel by the gravity of their own weight.

SUMMARY OF THE INVENTION

The present invention provides a plurality of freely rotatable ball bearing roller members which are spaced along a conveyor track at predetermined distances from each other. These are referred to as support or idler rollers, as distinguished from powered rollers. The idler rollers are inclined at a slight pitch so that trays placed on the conveyor track will advance under force of gravity. A series of powered rollers rotating at constant speed and covered with a low friction material are also spaced along the conveyor track at the same pitch as the idler rollers but spaced above them by about 1/16 in. Adjacent ones of the powered rollers are preferably spaced at a distance larger than the idler rollers so that a plurality of idler rollers will be located between adjacent ones of the powered rollers.

The spacing between adjacent powered rollers is, in one example, a little less than about twice the length of a tray, causing the following tray coming over a powered roller to shove along a preceding light loaded tray that might have become hung up between powered rollers. The powered rollers are adjustable in height to vary accurately the level above the plane of the free running rollers, and thus the degree of engagement with an overpasing tray. The surface of the power roller being of low friction material avoids a compounding of strong pressures of forward movement of upstream trays, and a resulting jamming and piling up of trays ahead as would occur were these rollers of a friction gripping type. Thus, by speeding up the underweight trays, while braking those of greater weight, the powered rollers effect a safe regulated speed of the total lineup of trays.

A number of trays may accumulate at the discharge end of the conveyor while leaving the powered rollers on because the powered rollers slip against the lower surface of the trays, thereby exerting a forward force in the event a tray is removed, but a force which is not sufficient to jack-knife adjacent trays. When the trays are removed from the discharge end, the remaining trays are urged forward by the powered rollers to fill up the gap. The powered rollers also regulate the speed of the descending trays. In the case of a more heavily loaded tray, the powered rollers arrest the speed of the tray. In the case of a lightly loaded or empty tray, the powered rollers apply a forward force to the tray.

A watertight pan forms a trough beneath all of the rollers and at the same pitch as the roller. The idler rollers are supplied with mountings that permit their easy removal for their cleaning and cleaning and sanitizing the conveyor pan. Thus, the inventive system provides a conveyor system for a food service establishment which is both a conveyor and an accumulation or storage facility for trays while not requiring personnel prior to the peak meal period or during intermissions. It eliminates the need for limit switches required on the belt or track powered systems and may be left on continuously without need for operating personnel except when the dishwasher is placed in operation.

An important factor in the workability of this principle is the use of a low friction surfaced power roller. These rollers positioned approximately 1/16 in. above the plane of the support rollers, and rotating at a controlled space, apply sufficient braking power against the bottoms of overweighted trays to slow down and establish their flow speed, while sufficient friction is provided to nudge underweight trays. At the same time the roller surface rotates almost friction free beneath trays when they come to rest above in the process of being accumulated and stored. Upon the removal of the first tray at the exit end, a combination of the two forces created by gravity and the powered rollers moves all trays forward one space. This system utilizes the advantages of the two prevailing types of conveyor systems; i.e., the belt or mechanically propelled type, and the gravity type, while eliminating the objectionable features of each.

Other features and advantages of this invention will be apparent to persons skilled in the art from the following detailed description of a preferred embodiment wherein identical reference numerals will refer to like parts in the various views.

THE DRAWING

FIG. 1 is a side elevational view, partially cut-away, of a dish tray conveyor system according to the present invention;

FIG. 2 is a plan view of a system of FIG. 1;

FIG. 3 is a cross sectional view seen through the sight line 3—3 of FIG. 2 showing the loaded station;

FIG. 4 is a close-up vertical cross sectional view taken through the sight line 4—4 of FIG. 2 showing both a freely rotatable support roller and a powered roller;

FIG. 5 is a vertical view, partly in cross sectional view, of the discharge station of the conveyor system of FIG. 2;

FIG. 6 is a close-up view of the removable mounting of a support roller;

FIG. 7 shows a perspective view of the mounting bracket for a support roller; and FIGS. 8–10 illustrate an adjustable mounting for a powered roller.

DETAILED DESCRIPTION

Referring first to FIGS. 1 and 2, there is illustrated a conveyor system for trays including, a loading station generally designated by reference numeral 10 at the left side of the drawing, a discharge station generally designated 11 at the right side of the drawing, and an inclined conveyor track generally designated 12 connecting the loading station 10 with the discharge station 11.

At the loading station there is located a horizontal table 13 having a plurality of raised tracks 14 (see FIG. 3) which may be nylon for supporting trays, such as the loaded tray generally designated 15 in FIG. 1, above the flat bed of table 13 to permit the trays to be pushed along the table with a minimum of effort and without sliding over dropped pieces of food, etc. There may also be conveniently located at the loading station 10 a sink as at 16 for soaking of silverware, the only item removed from trays at this point, excepting napkins. The function of the table 13 at the loading station 10 is to permit bussing personnel to rest a tray while combining contents of lightly loaded trays for more efficient use of the trays and conveyor space for storage and a smoother flow down the length of the conveyor to the discharge station where a high capacity washing machine is located.

Turning now to FIG. 3, the table 13 may rest on a cabinet generally designated 13a which houses the sink 16. A panel 13b connects the top of the table 13 with the side wall 17. In the illustrated embodiment, the entire conveyor system including the loading station, the track and the discharge station are designed to abut a vertical wall 17 (FIG. 3).

For convenience, there may also be located adjacent the loading station 10 an area 18 with openings in the separating wall 24 for the collection of soiled linen napkins and paper napkins and a slide generally designated by reference numeral 20 in FIG. 1 inclined at an angle toward the loading station and provided with a lower stop member 21 for returning empty silverware containers and their carrier racks from the kitchen silverware rolling station back to station 16 for reloading. A wall "24" normally will separate the storage area 18 from the kitchen area.

The conveyor track 12 is connected directly to the right-hand end of the table 13, and as seen best in FIG. 1, the conveyor track is inclined slightly downwardly from the table 13 to the discharge station 11. The conveyor track is supported on a frame which is illustrated in FIGS. 1 and 4. The frame includes a plurality of vertical legs designated 25, and the legs 25 are stabilized by means of longitudinally extending rails 26. The rails 26 are connected to side wall 17 by means of transverse cross rails 28. In the embodiment described herein the conveyor track is inclined at a pitch of about 0.7 in. per lineal foot of track. This pitch will vary with the weight of conveyed trays and freedom with which the idler rollers selected rotate.

A channel frame generally designated by reference numeral 30 in FIG. 4 and preferably formed of galvanized metal is supported by the upper ends of the legs 25 and extends longitudinally beneath the conveyor track 12 for supporting it. Secured to the channel frame 30 is a U-shaped trough generally designated 31 and including a first side wall 32, a bottom 33 and a second upright side wall 34, forming a watertight conveyor pan. The upright wall member 32 is suitably extended, as at 35 for attachment to the building wall 17 for support.

A plurality of freely rotatable roller members generally designated 38 (sometimes referred to as support or idler rollers and to be differentiated from the powdered rollers to be described) are located at predetermined spacing along the conveyor track 12, and each of the idler roller members 38 is supported by the upright side walls 32 and 34 of the stainless steel watertight conveyor pan 31. As best illustrated in FIG. 6, each of the idler rollers 38 includes an axle rod 39 on which are mounted a plurality of ball bearing rollers 40. Preferably, there are five of the ball bearing rollers secured to each side of the axle rod 39. The axle rod 39 is fitted at one end through an aperture 42 in the vertical side wall 32 of the conveyor pan 31. The other end of the axle rod 39 is provided with a rectangular steel plate 45 which is adapted to fit into a pocket formed by a bracket generally designated 46 which is secured to the inner surface of the side wall 34 of the conveyor pan 31. The bracket 46 is provided with a downwardly-extending groove 47 for receiving and supporting the axle rod 39 of its associated rollers. Thus, each of the idler rollers 38 may be removed from its mounting by lifting the plate 45 from its associated bracket 46 and then withdrawing the distal end of the rod 39 from its associated aperture 42 in the side wall 32.

Referring again to FIG. 4, two stainless steel angle irons designated respectively 44 and 45 are placed back to back and secured to the center of the upper surface of the bottom 33 of the conveyor pan 31 (also made of stainless steel) and extend longitudinally thereof. The uppermost edges of the angle irons 44 and 45 terminate slightly beneath the center of the axle rod 39 for supporting the rod under heavy load.

The conveyor pan 31, as already mentioned, is placed at a predetermined pitch; and the placement of the idler rollers 38 follows that pitch. The function of the idler rollers 38 is to support the loaded trays as they move under force of gravity in the direction of the hollow arrow of FIG. 1 (i.e. left to right) substantially without friction. The particular rollers described above have been found to work well and as spaced provide the additional advantage that they will accommodate the wire racks in which glassware is normally stored when clean, as more fully described below.

Driven or powered rollers are generally designated by reference numeral 50 in the drawing, and they are located at predetermined distances along the conveyor track 12. Although the invention is obviously not so limited, in one embodiment the spacing of the powered rollers 50 is approximately twice the length of one of the trays which typically may be 15 in. by 20 in. In this instance the axial spacing of adjacent or powered rollers is 35 in., and there are 7 idler rollers located between pairs of powered rollers, the axes of adjacent idler rollers being spaced at 5-in. intervals. These dimensions obviously may vary depending upon the overall length of the powered section of the conveyor system, the length and weight of the trays for which it is designed, the pitch of the conveyor rollers, etc.

Referring now to FIGS. 4 and 8–10, the mounting of the powered rollers 50 will be described in more detail. Each of the powered rollers 50 is provided with a shaft 51 which extends to either side thereof and is journaled in a side bearing 52 which is mounted on the back side wall 32 of the conveyor pan for vertical adjustment. Although other arrangements may be used for vertical adjustment, the bearing 52 is secured to a bracket 53 received in a vertically extending recess generally designated 54; and a bolt 55 extends out of the side of the recess 54 and through a vertically elongated aperture 56 in the back of the bracket 53. A nut 57 received on the bolt 55 secures the bracket 53 within the race, and the aperture 56 permits vertical adjustment of the bracket 53. Adjustment is accomplished by a conventional threaded unit which first adjusts the height of the roller; and the nut 57 and bolt 55 then secure the unit. A similar adjustment means is provided at the other end of each powered roller. A cover plate 59 (seen in FIG. 8) is mounted flush with the upright side wall 32 to cover the recess 54 and the mounting for the powered roller 50.

Turning now to FIG. 4, the other side of the shaft 51 extends through the upright side wall 34 of the conveyor pan and is secured to a hub 60 of a pulley 61. The pulley 61 is provided with an outer groove in which is mounted a first belt 63 which interconnects the driven pulley 50 with a similar powered roller unit located toward the downstream (i.e. into the plane of the page of FIG. 4) end of the conveyor system. The pulley 61 also contains an inner groove which is fitted with a second belt 64 interconnecting the powered roller of FIG. 4 with a similar powered roller unit located upstream of the roller shown. Thus, as can be seen in FIG. 1, adjacent ones of the powered roller units are interconnected by means of a belt and pulley arrangement, the one being located furthest downstream is designated in FIG. 1 by reference numeral 67, and it, in turn, is connected by means of a belt 68 to a pulley 69 driven by an electrical motor 70 which is mounted on the horizontal frame member 26.

The pulley arrangements are enclosed within a cover plate 75 (FIG. 4) as a protective measure and also for aesthetic purposes. The upper surfaces of the power rollers are adjusted to extend slightly above (of the order of 1/16 in.) the plane defined by the upper surfaces of the idler rollers so as to engage an overpassing tray.

Turning now to FIGS. 1, 2 and 5, the discharge station 11 includes a section of stainless steel idler rollers generally designated by reference numeral 80 and including a plurality of individual idler rollers 81. The section 80 is arranged to have top surfaces at the same pitch and on the same line as the idler rollers 38 and powered rollers 50 of the main track; and it is aligned to receive trays exiting from these rollers. The entire section 80 is arranged in stainless steel channel frames made in removable sections, and it is surrounded on its discharge end and adjacent the side opposite the wall 27 with a flat table surface 83.

A continuing table, sink and necessary washing facilities may be provided to best meet the objectives and opinions of the designer and operator.

In this application, the conveyor is used in conjunction with a Blakeslee flight type dishwashing machine, here identified as 87. A peripheral 10 in. splash at wall 84 forms an outer guard for the discharge station, and the discharge station is also provided with a sink 85 for routine soaking of hard to wash individual baking dishes, etc., and weekly machine brushing of glasses.

Also in this installation is to be noted the unique arrangement of washing and sanitizing all pots and pans through the flight type dishwasher. A pot soak sink containing a circulating pump is included, generally designated 86, for loosening food substances remaining on kitchenware (pots and pans, etc.).

The table 13 of the loading station, the conveyor pan 31 of the conveyor track and the pan 79 beneath the discharge roller section 80 are all stainless steel and sealed relative to each other to prevent dripping or seepage or water between them, and in order to facilitate cleaning of the conveyor hot water faucets 95 and 96 (seen best in FIG. 2) are located respectively at the loading station 10 and toward the beginning of the conveyor track for readily available water for cleansing the same. It will be observed that all of the idler rollers 38 are easily removed to permit free access for sanitizing and cleaning of the entire conveyor pan and that this entire pan is watertight to avoid wash water leaking through to equipment and floor below. This sanitary feature is an important operational asset of the inventive conveyor system.

In operation, the trays are pushed along the nylon tracks 14 of the table 13 located at the loading station 10 into the initial idler rollers 38 of the sloped conveyor track, and they are fed through force of gravity toward the discharge station. The trays, having a lower surface of plastic will engage the slightly raised surface of each of the powered rollers 50 as it passes, and be regulated to the constant speed of the powered rollers. That is, if a tray is heavily loaded its speed will be arrested as it hits each of the powered rollers 50. However, if the tray is unusually light and inclined to "hang up" on the track the powered rollers 50 act to move them on. During periods when the high capacity dishwasher 87 is shut down, the trays may accumulate first at the discharge station 11 on the roller section 80. As trays back up the conveyor track 12, some of the trays will rest upon the powered rollers 50. With proper adjustment of the contact area between the lower surface of the trays and the low friction surface of the powered rollers 50, the powered rollers will be permitted to slip freely beneath the plastic trays when they are stopped by preceding trays, without placing an overload on the power system and without causing a jack-knifing of trays stored on the system ahead. Further, the speed regulating function of the powered rollers insures that when one tray contacts a stopped tray ahead of it, the impact will not cause a series of problems by a scattering of contents upon the conveyor or, a jamming up of the line, creating crashing of broken tableware.

When trays are removed from the discharge station 11, the action of the power rollers will be to urge trays resting on them forwardly to fill the space of the removed trays thereby continuing to urge trays on the conveyor track toward the operator at the discharge station. Although there are a number of types of material that may be used to provide a low friction surface for the power rollers 50, I prefer to use a rigid plastic impregnated with carbon particles of the type used in molded bearings which is highly resistant to wear which, in combination with the adjustable feature of these power rollers permit achieving the right amount of friction between these power rollers and the trays to accomplish the above purposes.

The recessed perforated garbage pan located in sink 88 is conveniently positioned under the tray being unloaded into 87 for placement of food substances off the tray as put also into 87. The open sight pan reduces the hazard of items of tableware getting into a disposal located a few steps away.

Another advantage of this conveyor system is that by combining five of the small standard make bearings 40 at each side of the support rollers 38, the conveyor system is able to handle wire racks of the type which store glassware as well as the flat-bottom plastic trays. Thus, when one of the racks containing glassware is emptied, it may simply be placed on the conveyor track and will be conveyed toward the discharge end where it is stored, for convenient next use by "B."

Having thus described in detail a preferred embodiment of the inventive conveyor system, persons skilled in the art will be able to modify certain of the structure which has been illustrated and described and to substitute equivalent elements for those which have been disclosed; and it is, therefore, intended that all such modifications and substitutions be covered as they are embraced within the spirit and scope of the appended claims.

I claim:

1. A conveyor system for use in a food service establishment in transporting plastic trays of variable weight loads of dish ware from a loading station to a discharge station comprising a plurality of free-running support rollers mounted in spaced relation along a conveyor track from said loading station to said discharge station, the axes of said support rollers defining a predetermined downward pitch from said loading station to said discharge station for conveying said trays therebetween under force of gravity; a plurality of power rollers mounted in spaced relation along said conveyor track at a distance greater than the distance between adjacent ones of said support rollers, each of said power rollers having an integral cylindrical tray-engaging surface raised slightly above the upper surfaces of said support rollers provided with a low friction material for engaging the lower surface of overpassing trays; and means for rotating said power rollers and associated low friction surface material at generally constant peripheral speed; whereby the surface material of said power rollers will engage said trays and slip relative to said trays if the same are traveling at a different speed than the surface speed of said rollers such that said power rollers will arrest the speed of overpassing trays if the trays are moving faster than the peripheral speed of the power rollers and said power rollers will urge forward unobstructed trays moving slower than the peripheral speed of the power rollers, thereby to permit accumulation of trays at the discharge end of said conveyor by slippage between said plastic trays and said low friction material, said power rollers acting to advance remaining accumulated trays when one is removed from the discharge end.

2. The system of claim 1 further comprising a watertight conveyor pan extending substantially the entire length of the conveyor track beneath the support rollers and power rollers, and means for removably mounting said support rollers to said conveyor pan whereby said support rollers may be removed therefrom for cleaning and sanitizing the pan.

3. The system of claim 2 wherein each of said support rollers comprises an axle rod and a plurality of ball bearing rollers mounted thereon for rotation about an axis transverse of the direction of travel of said trays and wherein said means for removably mounting said rollers comprises an aperture in one side of said conveyor pan for receiving said support roller axle rod and a bracket at the other side of said support roller for receiving the other side of said axle rod.

4. The system of claim 1 further comprising at said loading station a generally horizontal table surface including a plurality of longitudinally extending rail members for slidably supporting trays for loading onto said conveyor track.

5. The system of claim 1 wherein each of said power rollers includes means for adjustably mounting the same to vary the height thereof for proper engagement with the lower surface of an overpassing tray.

6. The system of claim 1 wherein the pitch of said conveyor track is about 0.7 inch per lineal foot of track.

7. The system of claim 1 further comprising at said discharge station a section of idler rollers receiving trays from said power rollers for storing the same.

References Cited

UNITED STATES PATENTS

| | | | |
|---|---|---|---|
| 3,458,027 | 7/1969 | Matthews | 198—127 |
| 151,253 | 5/1874 | Tothammer | 198—127 |
| 2,983,352 | 5/1961 | Flora | 193—32 X |
| 3,381,800 | 5/1968 | Everett | 198—204 |

FOREIGN PATENTS

| | | | |
|---|---|---|---|
| 1,450,804 | 8/1966 | France | 193—35 |

EDWARD A. SROKA, Primary Examiner